United States Patent [19]

Jessen

[11] Patent Number: 5,407,740
[45] Date of Patent: Apr. 18, 1995

[54] CERAMIC COMPOSITES WITH CERAMIC FIBERS

[75] Inventor: Todd L. Jessen, Alexandria, Va.

[73] Assignee: The United States of America as represented by the Secretary of the Navy, Washington, D.C.

[21] Appl. No.: 179,013

[22] Filed: Jan. 7, 1994

[51] Int. Cl.⁶ ............................................... B32B 9/00
[52] U.S. Cl. ................................... 428/294; 428/244; 428/295; 428/296; 428/297; 428/298; 428/303; 428/366; 428/379; 428/380; 428/381; 428/384; 428/387; 428/389; 428/392
[58] Field of Search ............... 428/114, 294, 297, 298, 428/366, 376, 379, 380, 381, 384, 387, 388, 389, 392, 5, 303; 501/95, 90

Primary Examiner—Patrick J. Ryan
Assistant Examiner—Rich Weisberger
Attorney, Agent, or Firm—Thomas E. McDonnell; George A. Kap

[57] ABSTRACT

A preferred composite which is useful at temperatures in excess of about 1000° C. comprising a ceramic matrix and 40–60% on volume basis of coated and uncoated fibers embedded in the matrix generally parallel to each other and in a controlled arrangement; the matrix is selected from the group consisting essentially of silicon nitride, silicon carbide and zirconium titanate; the fibers are silicon carbides fibers 5–20 microns thick; the coating on the coated fibers is boron nitride 0.1–0.3 microns thick; cross-section of the composite contains about one half, on volume basis, of uncoated fibers in one band extending from one side edge of the cross-section to the opposite side edge; the composite having unexpectedly improved strength and/or toughness compared to a composite composed of only coated or only uncoated fibers.

13 Claims, 1 Drawing Sheet

XXXXXXXXXXXXXXXXX

XXXXXXXXXXXXXXXXXX

OOOOOOOOOOOOOOOOO

OOOOOOOOOOOOOOOOO

CERAMIC COMPOSITES WITH CERAMIC FIBERS

FIELD OF THE INVENTION

This invention pertains to the field of composites having a controlled arrangement of coated and uncoated reinforcing fibers within a matrix.

BACKGROUND OF INVENTION

Ceramic composites reinforced with ceramic fibers have been known for many years for their strength and toughness. The high toughness of these composites has been characteristically associated with limited bonding between the fibers and the matrix in order to give substantial fiber pull-out as a major source of toughening. On the other hand, brittle failure in unsuccessful composites and resultant flat fractures with essentially no fiber pull-out have been attributed to strong bonding between the fibers and the matrix.

Coatings may be applied to the fibers to limit bonding and chemical reactions with the matrix if the coating has suitable coherence to the fibers and does not spall off. Prior art ceramic fiber composites with metal coated fibers are suitable only for low temperature processing and use because of the relatively low melting point of the metal coatings.

U.S. Pat. No. 4,642,271 discloses ceramic composites suitable for high temperature processing and use. This patent discloses ceramic composites containing ceramic fibers coated with boron nitride and disposed in ceramic matrices. The coating on the ceramic fibers limits bonding between the fibers and the matrix, protects fibers from mechanical damage during handling and processing, provides chemical protection from attack by the matrix during processing, and limits oxidation embrittlement of the ceramic fiber composites.

Ceramic fiber composites have been developed to take advantage of the attractive properties of ceramics while minimizing their brittleness. The attractive ceramic properties of ceramic fiber composites include use temperatures of up to about 1000° C., high temperature structural integrity and high temperature corrosion resistance. The need for high operating temperatures in aircraft engines and reduced emission requirements eliminate the majority of other materials for components in military aircraft and combustor components in advanced designs for both commercial and military aircraft engines. Additionally, the approximately 50% higher specific fracture energy of ceramic fiber composites in comparison to steel makes ceramic fiber composites an excellent candidate for armor superstructures of naval vessels, tanks and other fighting vehicles. Nevertheless, because ceramic fiber composites are more expensive, they have not replaced steel in these applications.

OBJECTS OF INVENTION

An object of this invention is a reinforced ceramic composite having improved mechanical properties.

Another object of this invention is a ceramic fiber composite having improved mechanical properties at high temperature exceeding 1000° C.

These and other objects of this invention are accomplished by a composite comprising coated and uncoated ceramic fibers disposed in a ceramic matrix in a controlled arrangement.

DETAILED DESCRIPTION OF INVENTION

Figure 1:
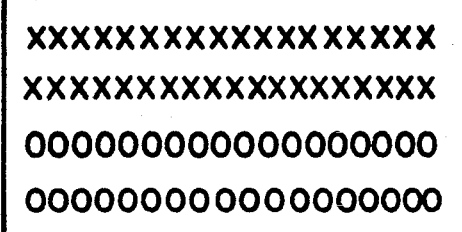
FIG. 1 is a cross-section of a ceramic fiber composite showing coated fiber tows x and uncoated fiber tows o wherein the uncoated band of fiber tows occupies about one-half of the lower horizontal portion whereas the coated band of fiber tows occupies the upper one-half of the composite cross-section.

This invention pertains to composites useful at high temperatures comprising coated and uncoated ceramic fibers combined in controlled arrangements and disposed in a ceramic matrix. Such composites, due to the controlled arrangement of the fibers, have improved strength and/or toughness.

The controlled arrangement of coated and uncoated tows of fibers requires that from at least 20% and up to 80% by volume, preferably 30–70%, and especially about one half of the fibers in a cross-section of the composite, be uncoated fibers disposed in a matrix whereas the remainder are coated fibers disposed in the same matrix. Assuming a horizontal rectangular composite cross-section, the uncoated fibers are disposed in at least one, and preferably one uniform band extending from one side edge of the cross-section to the opposite side edge. If the composite cross-section is circular or oblong or is other than rectangular or a parallelogram, then the composite cross-section can be defined by a vertical cut running from an outer surface to the center of the cross-section and stretching the composite out horizontally so that it more nearly resembles a parallelogram. The band of the uncoated fibers can be off-set vertically from the lower edge of the cross-section or downwardly from the upper edge of the cross-section or be at some intermediate location between the upper and lower edges of the cross-section. The band of the uncoated fibers can also extend directly upward from the lower edge of the cross-section or directly downward from the upper edge thereof.

As used herein, the term "band" means a continuous segment within the cross-sectional area of a composite containing either coated or uncoated fibers, which, if it contains a sufficient amount of uncoated fibers, yields a ceramic fiber composite which is useful at temperatures of at least 1000° C. and has unexpected mechanical properties, particularly tensile strength and fracture toughness.

If the composite is thick, more than one band of uncoated fiber segments can be present in the composite. In such an instance, each band of uncoated fibers will contain two or more horizontal rows of uncoated fiber tows, each band being separated by one or more, preferably 1–20, horizontal rows of coated fiber tows or a horizontal band of about 10–30% of coated fibers as a percentage of the total coated and uncoated fibers in the composite. If the cross-section of a composite contains one horizontal band of uncoated fibers, the two bands of coated fibers are generally evenly and uniformly distributed above and below the band of the uncoated fibers, in the case where the band of the uncoated fibers is disposed in the cross-section of a composite at an intermediate distance between what corresponds to lower and upper surfaces of the composite.

The band of uncoated fibers need not extend from one side edge to the opposite side edge of the composite cross-section. If the band does not extend from one side edge to the opposite, the improved mechanical properties will be realized only in the section of the composite where the band is located. This makes it possible to design a composite having varying mechanical properties by locating the band at the desired locations within the cross-section where improved mechanical properties are needed.

In a preferred embodiment schematically illustrated in FIG. 1, a ceramic fiber composite is prepared whereby tows of 500 coated or uncoated ceramic fibers are arranged in a ceramic matrix. The band of uncoated ceramic fibers occupies about one-half of the lower portion of the composite cross-section whereas tows of the coated ceramic fibers occupy the upper portion of the composite cross-section. With the force applied to the composite from above, the lower surface is considered to be in tension whereas the upper surface is considered to be in compression. This composite shows strength improvement of more than 200% over a composite composed solely of the same uncoated fibers in the same matrix and over 100% over a composite composed of ceramic fibers in the same matrix wherein only about one-half of all the fibers were coated fibers. In terms of toughness, as expressed by relative work of fracture results, the respective improvements were nearly 1000% and above 100%.

Figure 2:
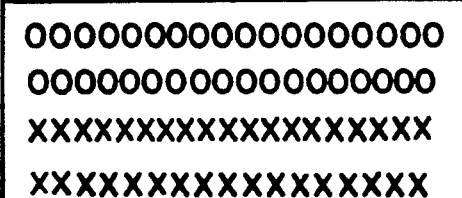
FIG. 2 is a cross-section of a ceramic fiber composite wherein the band of uncoated fiber tows occupies the upper horizontal one-half and the band of coated fiber tows occupies the lower horizontal one-half of the composite cross-section.

In another preferred embodiment schematically illustrated in FIG. 2, the band of uncoated ceramic fibers occupies the upper portion of the composite cross-section whereas the band of the coated ceramic fibers occupies the lower portion of the composite cross-section. The force is applied from above so that the lower surface of the composite is considered to be in tension whereas the upper surface of the composite is considered to be in compression. This composite shows strength improvement of nearly 300% over a composite composed solely of the same uncoated ceramic fibers in the same matrix and over 100% over a composite composed solely of the coated ceramic fibers in the same matrix wherein only about one-half of all the fibers were coated fibers. In terms of toughness, the respective improvements were over 1000% and over 100%.

A wide variety of ceramic matrices can be used to make the composites with improved physical properties. Suitable matrices include silicon nitride, silicon carbide, silica, 96% silica with 4% boron oxide, zirconia, zirconia-titania mix, mullite and cordierite. The preferred matrix is silicon carbide.

The ceramic fibers may be made from single crystal and polycrystalline materials selected from silicon carbide; alumina; graphite; YAG oxide which is composed of yttrium oxide, aluminum oxide, and garnet oxide; mullite which is 3 $AL_2O_3.2SiO_2$; and silicon nitride. Typically, the ceramic fibers should be made from single crystal silicon carbide.

The ceramic fibers herein are typically continuous, which means that the aspect ratio thereof is at least 20, preferably at least 50, and especially at least 100.

Although the ceramic fibers may vary in thickness from a small fraction to 150 microns, the typical fiber thickness is from about 1 micron to about 50 microns, especially about 5–20 microns. The fibers can be of any desired cross-section, however, the typical cross-section is about circular. Fibers are usually coated by a protective sizing coating which burns away at an elevated temperature exceeding about 300° C.

Individual fibers can be many meters long. They are arranged in tows which contain a varying number of fibers. Tow size can range from about 100 to 6000 fibers. Fibers are arranged in tows for practical reasons, such as to facilitate handling thereof. An organic sizing can be used to bind fibers in a tow.

A proportion of at least 30% by volume fibers, coated and uncoated, is recommended to be included in the ceramic composite of this invention, with a range of about 40–60% being typical.

The thickness of the fiber coating may also vary over a broad range with good results. Coating thickness as thin as 0.05 micron and as thick as several tenths of a micron, such as 0.6, typically 0.1–0.3 micron, have been used according to the invention with success.

The coating thickness used will depend upon a number of factors. A very thin coating, on the order of several angstroms, is adequate to prevent physical bonding between the fibers and matrix if the coating is sufficiently uniform. However, such thin coatings will allow chemical reactions to occur between the fibers and matrix.

Thick coatings may prevent both physical bonding and chemical reaction between the fibers and the matrix, but thick coatings are more expensive to apply and may have a detrimental effect on the strength of the final composite if the thickness of the coating is more than a small fraction of the fiber diameter.

Suitable coatings are made from materials that can provide the advantages of the composites noted herein, including debonding at the interface of the coating and the matrix. Typical materials include boron nitride and carbon, with boron nitride being the preferred coating material.

The coating, such as the boron nitride coating, can be provided on the ceramic fibers by any technique, for example, chemical vapor deposition technique, from sources such as boron trichloride and ammonia or borazine. In chemical vapor deposition, borazine is the typical source of boron nitride because lower processing temperatures can be used.

Numerous fiber arrangement schemes can be envisioned based on this invention's concept. An additional benefit beyond the general improvement in mechanical properties with this technique is that by simple rearrangement of the fiber schemes, either the strength or the fracture resistance can be maximized for specific applications, without any additional processing or procedure change.

The ceramic fiber composites of this invention can be made using a conventional process. Pursuant to one suitable process, uncoated ceramic fibers are obtained in the form of tows composed of a multiple number of sized fibers. A polymeric coating is provided on the uncoated fibers to prevent damage to the fibers in transit. The sizing is burned-off by heating the tows at an elevated temperature of several hundred degrees Centigrade for several hours until the sizing is removed. The uncoated and desized tows are then disposed in a chemical vapor deposition apparatus under a carbon monoxide atmosphere where a suitable coating is deposited on the fibers in the tows. Although any temperature above 500° C. can be used to deposit a coating on the fibers, a temperature of less than about 1000° C. reduces the possibility of fiber degradation. If borazine is used as a source of the boron nitride coating, a deposition temperature of about 900° C. is typical. After the coating deposition, the tows of coated fibers are removed from the chemical vapor deposition apparatus and allowed to cool to about room temperature (22° C.).

The next step after preparing tows of coated fibers is the layup of coated and uncoated fiber tows typically in a screen basket. The coated and uncoated tows are arranged, typically by hand, so that 20–80% by volume, preferably 30–70%, and especially about one half of the uncoated fibers are in one continuous band in a cross-section of the composite wherein the band is horizontal and of a uniform thickness extending from one side edge of the cross-section to the opposite side edge.

If the composite is thick, more than one band of uncoated fiber tows can be provided in the composite, as determined from a cross-section of the composite. In such an instance, each band will contain two or more horizontal and parallel rows of tows of uncoated fibers, each band separated from the other by one or more horizontal rows of tows of coated fibers.

When the layup of the coated and uncoated tows in the screen basket is finished, the screen basket is typically lowered into a matrix precursor of liquid metal alkoxide for a sufficient time to deposit a layer of the matrix precursor on and around the coated and uncoated fibers. The screen basket is then removed from the liquid matrix precursor and dried over steam to convert or to hydrolyze the metal alkoxides to the corresponding hydroxides. To build-up a sufficient amount of the matrix, the screen basket can be lowered into the matrix precursor several times, each time followed by drying over steam to convert the alkoxides to hydroxides.

Typically, the composite is next calcined or heat treated to preserve the matrix in an amorphous state and to convert the hydroxides to oxides. The calcining temperature is typically in the range of 500–700° C. and calcining duration is usually about one-half to two hours. Calcination can be conducted in an inert atmosphere or in a room atmosphere.

After calcination, the composite is typically hot-pressed at an elevated temperature and pressure in a carbon monoxide atmosphere. The hot-pressing step also converts the matrix metal hydroxides to the matrix metal oxides. The use of a carbon monoxide atmosphere, while not absolutely needed, is believed to reduce fiber degradation and to retard carbon and oxygen diffusion from the fibers. The carbon monoxide is typically at an overpressure in excess of 1 atmosphere, the hot-press temperature is typically in the range of 1200–1300° C. and the hot-press pressure is in the range of 15–35 MPa.

Following the hot-pressing operation, the composite is cooled to about room temperature and tested for mechanical properties. The ultimate strength and fracture toughness or fracture resistance, as determined by relative work-of-fracture comparisons, were measured at room temperature. Ultimate strength was measured on test bars 30–35 mm long with a rectangular cross-section of 1.4 mm by 3.0 mm using the four-point flexure test where specimens were broken using an outer span of 27 mm and an inner span of 9 mm at a strain rate of 0.003/sec. Typically, eight specimens were broken to determine the average ultimate strength. Ultimate strength was calculated from the maximum load measured from the load-deflection curves for each specimen. The uncoated, coated and mixed fiber composites exhibited nonlinear behavior during loading.

The modified measurement for each specimen used herein to determine relative toughness, while not the classic total area under the curve fracture energy determination, was deemed more appropriate for these composites as many of them never failed completely. The results were obtained from the width at half height of the load/time trace for each sample tested.

The invention having been generally described, the following example is given as a particular embodiment of the invention to demonstrate the practice and advantages thereof. It is understood that the example is given by way of illustration and is not intended to limit in any manner the specification or the claims that follow.

EXAMPLE

Figure 3:
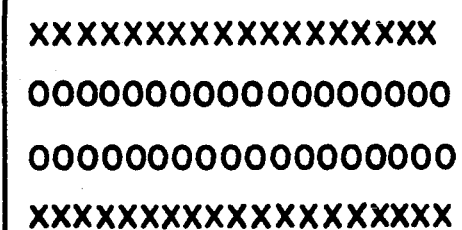
FIG. 3 is a cross-section of a ceramic composite wherein a band of coated tows occupies the top horizontal one-quarter, a band of uncoated fiber tows occupies the middle horizontal one-half, and a band of coated fiber tows occupies the bottom horizontal one-quarter of the composite cross-section.

This example illustrates a ceramic fiber composite as shown in FIG. 3 and its preparation.

The composite was rectangular in cross-section of 1.4 mm by 3.0 mm and had a length of 35 mm. The fibers were Nicalon ® silicon carbide fibers of 10–15 microns in outside diameter. The fibers were used in the form of tows which contained 500 coated or uncoated fibers. The coating on the coated fibers was amorphous boron nitride (BN) of 0.1 micron thickness. The tows of coated and uncoated fibers were arranged in the manner shown in FIG. 3, with one horizontal band of tows of coated fibers at the upper portion of the composite cross-section comprising 25% of the total fiber volume fraction, one horizontal band of tows of uncoated fibers disposed about centrally of the composite cross-section comprising 50% of the total fiber volume fraction, and one horizontal band of tows of coated fibers disposed at the lower portion of the composite cross-section comprising the remaining 25%. The band of uncoated fibers consisted of horizontal rows of tows disposed directly over the lower row of coated fibers. The tows extended generally parallel to each other and longitudinally of the composite along the length thereof.

The uncoated as-received fibers in the form of tows had a sizing coat which was removed, prior to the arrangement described above, by heating the tows in air at about 400° C. for about 3 hours. When it was desired to coat the fibers, the desired tows of uncoated fibers were charged into a cylindrical tube reaction vessel and the gases boron trichloride and ammonia reacted at about 970° C. in the reaction vessel to produce solid boron nitride which deposited on the fibers and gaseous hydrochloric acid which was removed from the reaction vessel. The tows of coated fibers were removed from the reaction vessel and cooled. The tows of the coated fibers and tows of the uncoated fibers were then cut to 7.5 cm lengths and manually placed in a wire cage (not shown) in the arrangement of the tows shown in FIG. 3 to form a fiber preform and the fiber preform was then immersed in a room temperature solution of zirconium n-propoxide and titanium isopropoxide mixed in a proportion to yield 50 mol % zirconium oxide ($ZrO_2$) and 50 mol % titanium oxide ($TiO_2$) diluted by 50% with absolute ethanol. The fiber preform was dried for 4 hours over a beaker of water in a drying oven at 110° C., which hydrolyzed the alkoxides, leaving the matrix as a mixture of hydrated zirconium and titanium hydroxides. After three infiltrations, the preform was calcined in flowing air at about 600° C. Typically, four iterations of this infiltration-calcination procedure were undertaken until the matrix pickup was sufficient such that the volume percent of matrix of the composite was approximately 50%. The porous composite was then hot-pressed at 1270° C. for one-half hour in an overpressure of 1.1 atm of carbon monoxide, with an applied pressure of 17.25 MPa.

Ultimate strength and fracture resistance were measured at room temperature and showed strength of the composite of 870 MPa with one standard deviation of 213 MPa and normalized work of fraction of 1.36, normalized to work of fraction of a composite made from all coated fibers. Ultimate strength was measured using the four-point flexure test. The composite test specimens were broken using an outer span of 27 mm, inner span 9 mm, and a strain rate of 0.003/s. Eight samples were broken to determine the average ultimate strength. Ultimate strength was calculated from the maximum load measured from the load-deflection curves for each bar. The modified measurement for each specimen used herein to determine relative toughness, while not the classic total area under the curve, was deemed more appropriate for these composites as many of them never failed completely. The results were obtained from the width at half height of the load/time trace for each sample tested.

While the invention has been described in detail with reference to preferred embodiments thereof, it is understood that variations and modifications thereof may be made without departing from the true spirit and scope of the invention.

What is claimed is:

1. A composite comprising a ceramic matrix and coated and uncoated ceramic fibers about parallel to each other disposed in a controlled arrangement characterized in that the coated fibers and the uncoated fibers form separate continuous bands of uniform thickness in said matrix, said uncoated fibers are about 1–50 microns thick, said composite having a use temperature in excess of about 1000° C. and improved strength or toughness compared to a composite comprising all coated or all uncoated fibers.

2. The composite of claim 1 wherein said matrix is selected from the group consisting of silicon nitride, silicon carbide, silica, 96% silica and 4% boron oxide, zirconia, zirconium titanate, mullite, cordierite, and mixtures thereof; wherein said fibers are selected from the group consisting of silicon carbide, alumina, graphite, sapphire, yttrium oxide-aluminum oxide-garnet oxide, silicon nitride and mixtures thereof; and wherein the coating on said coated fibers is selected from the group consisting of boron nitride, carbon and mixtures thereof.

3. The composite of claim 1 wherein said matrix is selected from the group consisting of single crystal and polycrystalline high temperature materials and said fibers have aspect ratio of at least 20.

4. The composite of claim 3 wherein a cross-section of said composite contains 20–80% by volume uncoated fibers in at least one band extending from one side edge of said cross-section to the opposite side edge, said side edges being about parallel to said fibers.

5. The composite of claim 3 wherein a cross-section of said composite contains 20–80% by volume uncoated fibers in one band extending from one side edge of said cross-section to the opposite side edge.

6. The composite of claim 3 wherein cross-section of said composite contains 30–70% by volume uncoated fibers in one band extending horizontally from one side edge of said cross-section to the opposite side edge.

7. The composite of claim 1 wherein cross-section of said composite contains about one half, on volume basis, of uncoated fibers in one band extending from one side edge of the cross-section to the opposite side edge; wherein said matrix is selected from the group consisting essentially of silicon carbide, zirconium titanate and mixtures thereof; wherein said fibers are silicon carbide fibers 5–20 microns thick; wherein coating on said fibers is boron nitride 0.1–0.3 thick; and wherein volume proportion of said coated and said uncoated fibers in said composite is about 40–60%.

8. A composite having a use temperature in excess of about 1000° C. comprising a matrix and coated and uncoated continuous fibers characterized in that the coated fibers and the uncoated fibers form separate continuous bands of uniform thickness embedded in said matrix in a controlled arrangement, said coated and uncoated fibers being generally parallel to each other; said matrix being selected from the group consisting of single crystal and polycrystalline materials; said fibers being selected from the group consisting of silicon carbide, alumina, graphite, sapphire, yttrium oxide-aluminum oxide-garnet oxide, silicon nitride, and mixtures thereof, said fibers being 1–50 microns thick; coating of said coated fibers being 0.05–0.6 micron thick; the volume proportion of said coated and uncoated fibers in said composite being at least 30% based on said matrix and said coated and said uncoated fibers in said composite; and said composite having improved strength or toughness compared to a composite containing only coated or uncoated fibers.

9. The composite of claim 8 wherein said coated and said uncoated fibers have an aspect ratio of at least 20; wherein said matrix is selected from the group consisting of silicon nitride, silicon carbide, zirconium titanate and mixtures thereof; wherein said fibers are silicon carbide fibers 5–20 microns thick; wherein said coating on said coated fibers is boron nitride 0.1–0.3 micron thick; and wherein a cross-section of said composite contains about 20–80% by volume uncoated fibers in one band extending from one side edge of said cross-section to the opposite side edge.

10. The composite of claim 9 wherein said cross-section of said composite contains about 30–70% by volume of uncoated fibers in said one band.

11. A composite having a use temperature in excess of about 1000° C., comprising a matrix and coated and uncoated fibers characterized in that the coated fibers and the uncoated fibers form separate continuous bands of uniform thickness embedded in said matrix in a controlled arrangement, said coated and uncoated fibers being generally parallel to each other; said matrix being selected from the group consisting of single crystal and polycrystalline materials; said fibers being selected from the group consisting of silicon carbide, alumina, graphite, sapphire, yttrium oxide-aluminum oxide-garnet oxide, silicon nitride, and mixtures thereof, said fibers are 1–50 microns thick; said coating of said coated fibers being 0.05–0.6 micron thick; the volume proportion of said coated and uncoated fibers in said composite being at least 30% based on said matrix and said coated and said uncoated fibers in said composite; and said composite having improved strength or toughness compared to a composite containing only coated or uncoated fibers.

12. The composite of claim 11 wherein said coated and said uncoated fibers have an aspect ratio of at least 100; wherein said matrix is selected from the group consisting of silicon nitride, silicon carbide, zirconium titanate and mixtures thereof; wherein said fibers are silicon carbide fibers about 5–20 microns thick; wherein said coating on said coated fibers is boron nitride about 0.1–0.3 micron thick; and wherein about 20–80 total volume percent of said fibers are uncoated fibers disposed in a continuous band in a cross-section of said composite; said one band extending from one side edge of said cross-section to the opposite side edge.

13. The composite of claim 12 wherein said cross-section of said composite contains about 30–70% by volume of uncoated fibers in said one band.

* * * * *